United States Patent [19]
Wolbrom

[11] Patent Number: 5,693,273
[45] Date of Patent: Dec. 2, 1997

[54] METHOD OF MAKING MULTI-POROSITY POROUS PLASTIC STRIPS

[75] Inventor: Irving M. Wolbrom, New York, N.Y.

[73] Assignee: Redound Industries, Inc., College Point, N.Y.

[21] Appl. No.: 526,449

[22] Filed: Sep. 11, 1995

[51] Int. Cl.$^6$ ............................................. B32B 31/18
[52] U.S. Cl. .................... 264/113; 264/118; 264/122; 264/125; 264/159; 264/241; 264/DIG. 63; 156/255
[58] Field of Search .......................... 264/109, 112, 264/113, 118, 122, 125, 158, 159, 160, 241, DIG. 7, DIG. 63; 156/62.2, 62.8, 242, 258, 264, 255

[56] References Cited

U.S. PATENT DOCUMENTS

| | | | |
|---|---|---|---|
| Re. 27,617 | 4/1973 | Olsen | 156/255 |
| 1,951,853 | 3/1934 | Walsh | 264/158 |
| 2,066,798 | 4/1937 | Pickett | 264/241 |
| 2,085,859 | 7/1937 | Kay | 264/241 |
| 2,158,086 | 5/1939 | Roberts et al. | 264/158 |
| 3,524,789 | 8/1970 | Olsen | 156/255 |
| 4,364,984 | 12/1982 | Wentworth | 264/113 |
| 4,731,145 | 3/1988 | Senzani | 156/264 |

Primary Examiner—David A. Simmons
Assistant Examiner—Kenneth M. Jones
Attorney, Agent, or Firm—Levine & Mandelbaum

[57] ABSTRACT

A method of making dual or multi-porosity porous plastic strips comprising placing a first quantity of plastic granules into a mold, and placing a second or additional quantities of plastic granules into the mold above the first quantity. The particle sizes of each of the quantities of granules placed into the mold are different from the particle sizes of all the other quantities of granules in the mold. The granules are subjected to heat and pressure so as to fuse them together into a self-sustaining porous plastic billet. The billet has a number of fused-together regions corresponding to the number of quantities of granules placed into the mold. The billet is sliced in a direction transverse to the planes containing the interfaces between the regions of the billet so as to create strips, each strip comprising interconnected regions have porosities which differ from one another. The mold may be cylindrical and the strip created by skiving it off the cylindrical surface of the billet. A fusible barrier sheet or sheets may be placed into the mold between the quantities of granules so that the final strips contain micro-porous or non-porous barrier layers between the porous plastic regions. Where a barrier layer is used, the two porous plastic regions could be of the same porosity.

5 Claims, 1 Drawing Sheet

METHOD OF MAKING MULTI-POROSITY POROUS PLASTIC STRIPS

This invention relates to a method of making porous plastic elements of the type in which different regions of the element have different degrees of porosity, and/or different regions are separated by a barrier layer. Such elements find usefulness in a number of different fields, such as devices for conducting immunoassays and in pregnancy diagnostic kits.

The term "porous plastic" is intended to refer to a synthetic resin or polymer body having an open cell construction which defines interconnected passageways throughout the body to make the latter porous. The degree of porosity of the plastic body refers to the average size of the flow area of the passageway, the larger the size the higher the porosity. While the present invention is theoretically useful throughout a wide range of porosities, it is primarily concerned with porous plastics having porosities which are capillary in nature.

Porous plastic bodies having regions with different porosities have been made and used in the past. However, these bodies have usually been assembled from separately fabricated units of different porosity and then joined together such as by use of a suitable adhesive. Such a method of fabrication is cumbersome, time consuming, and expensive.

It is an object of the present invention to provide a method of making a dual-porosity or multi-porosity porous plastic strip, i.e., a unitary strip having two or more distinct regions. Each region may have a porosity different from the porosity of each of the other regions. In some cases, the regions may be of the same porosity, but separated by a micro-porous or non-porous barrier layer.

It is another object of the invention to provide such a strip without the need for independently fabricating the regions of different porosity followed by an interconnecting step for joining the various regions together.

According to one aspect of the invention, a quantity of plastic granules of one size are placed into a mold followed by a second quantity of plastic granules of a different size, thus establishing within the mold two separate quantities of granules of different sizes. The granules are then subjected, within the mold, to heat and pressure so as to sinter the granules together to form a self-sustaining porous plastic billet. Because the plastic granules of the two different quantities are of different particles sizes, the resulting billet is a unitary body having two regions with two different porosities. The billet is then sliced crosswise of the interface between the two regions of the body to create strips, each of which has two interconnected regions with porosities which differ from each other.

If more than two regions of different porosities are required in the final strip, more than two quantities of plastic particles are introduced into the mold, in series, so as to establish three or more regions within the mold each filled with particles of a size different from the particles in the other regions of the mold.

Preferably, the mold is cylindrical, so that a cylindrical billet is produced, and the strip is created by skiving the strip from the cylindrical surface of the billet.

It is sometimes desirable to incorporate a micro-porous or non-porous barrier layer between the different-porosity regions of the porous plastic. In such a case, a micro-porous or non-porous plastic sheet is placed in the mold between the quantities of different-sized particles. Under heat and pressure, the sheet becomes fused to the two regions of particles which it separates and the sheet remains part of the final strips which are sliced from the molded billet.

Where a barrier layer is incorporated between the regions of the porous plastic strip, it is sometimes useful for the porosities of the regions to be equal rather than different. Therefore, the terms "dual-porosity" or "multi-porosity" as used herein are intended to refer to strips having at least two distinct regions in which the porosities of the regions are the same or different.

Additional objects and features of the present invention will be apparent from the following description, in which reference is made to the accompany drawings.

FIGS. 1–4 illustrate a method, according to the invention, of making a dual-porosity plastic strip, i.e., a strip having two side-by-side regions of different porosities. A cylindrical mold 10 is provided, into which is placed a first quantity 11 of plastic granules, after which a second quantity 12 of plastic granules is placed in the mold above the level of the first quantity 11. The size of the granules of quantity 12 is different from the size of the granules of quantity 11. The mold is heated, and by means, for example, of a piston 13, the granules in the mold are subjected to pressure. The plastic granules is subjected to sufficient heat and pressure to cause them to sinter or fuse together, but leaving pores or spaces between the individual granules.

Figure 1:
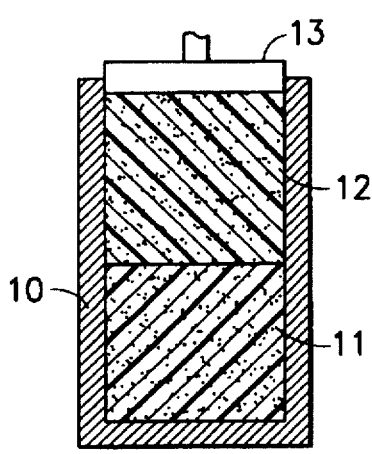
FIG. 1 is an axial cross-sectional view through a mold containing two quantities of different sized plastic granules.
Figure 2:
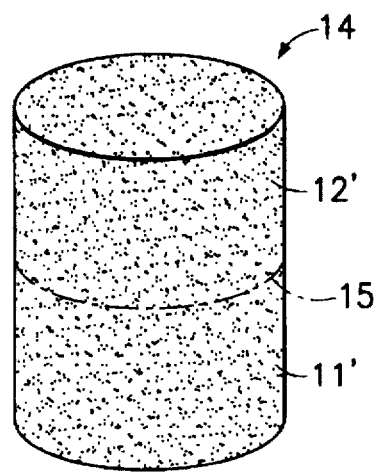
FIG. 2 is a perspective view of a billet molded in the mold of FIG. 1.

The result of the molding process is a self-sustaining cylindrical porous plastic billet 14, illustrated in FIG. 2. The billet incorporates two regions 11' and 12' corresponding to the quantities of plastic granules 11 and 12 of FIG. 1. Because the plastic granules 11 and 12 are of different sizes, the resulting regions 11' and 12' of billet 14 will have different porosities. The two regions 11' and 12' are fused together at an interface indicated by the broken line 15 in FIG. 2.

Figure 3:
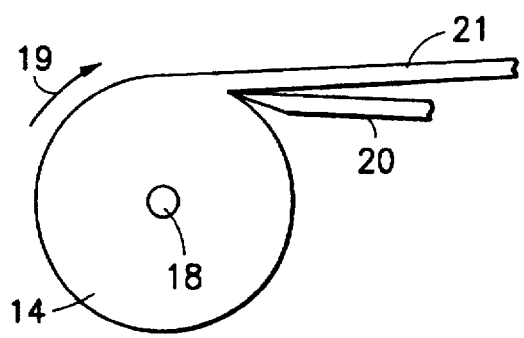
FIG. 3 shows a dual-porosity plastic strip being skived from the surface of the plastic billet of FIG. 2.
Figure 4:
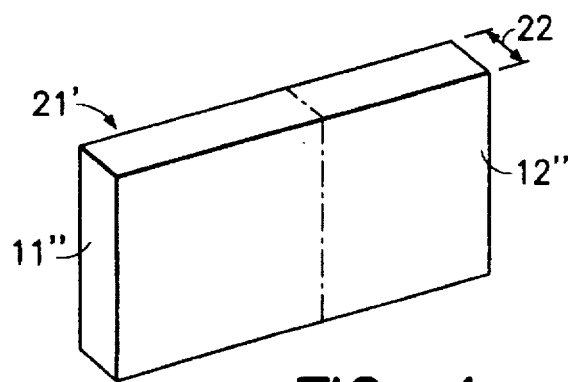
FIG. 4 is a perspective view of the final dual-porosity plastic strip.

In order to create a dual-porosity porous plastic strip from the billet 14, the billet is subjected to a skiving operation illustrated in FIG. 3. More specifically, the billet is mounted to rotate on its axis 18, for example in the direction of arrow 19 in FIG. 3. A cutting blade 20 is arranged with its cutting edge extending parallel to axis 18, i.e., crosswise of the plane containing the interface 15 between the two regions of the billet. Due to rotation of the billet with respect to the blade edge, a strip 21 is sliced or skived, from the cylindrical surface of the billet. The length of strip 21 will depend upon the diameter of the billet and the thickness of the strip produced. The thickness of strip 21, i.e., the dimension 22 in FIG. 4, is typically between about ten mils and one half inch. If the desired, strip 21 can be cut into individual sections 21', illustrated FIG. 4. Strip section 21' includes two regions 11" and 12" corresponding to the regions 11' and 12' of billet 14. Thus, the regions 11" and 12" of the final strip 21' constitute part of a unitary element but have different porosities.

The plastic granules used to form the dual-porosity or multiporosity strip of the present invention may be any suitable thermoplastic synthetic resin. Suitable resins are those which are sinterable without melting, i.e., those characterized by a relatively large difference between their sintering and melting temperatures, the sintering temperatures being lower than the melting temperatures. Typical resins useful for this purpose are very high or ultra-high molecular weight polyethylene, very high molecular weight polypropylene, polyvinylidene fluoride, polyteterafluorethylene (Teflon), polysulfone, and ethylene vinyl acetate, although many other substantially non-melting, but sinterable, resins may also be employed.

In most cases, the different-sized plastic granules used to produce the billet will be of the same resin. However, in some cases, different resins may be used for the different sized particles. In the latter case, care must taken so that the fusing temperatures of the particles are compatible. In other words, the particles must fuse at around the same temperature, so that the resin of one quantity of particles does not completely melt before the resin of the other quantity of particles fuses. In any case, the temperature and pressure levels employed to produce billet 14, whether the resin particles are all the same or different, will depend upon the particular plastic or plastics used, and such values are known to, or readily determinable by, one skilled in the plastic molding art.

The size of the plastic granules should be such that the diameters, prior to fusing, are in the range between about thirty microns and eight hundred microns, assuming that porosities of capillary nature are desired. If granules having diameters greater than eight hundred microns are used, there is some danger that passageways created between the fused granules will be larger that capillary size. If granules having diameters smaller than about thirty microns are used, the pores left between the fused particles will likely be so small that liquids will not readily pass through.

Figure 5:
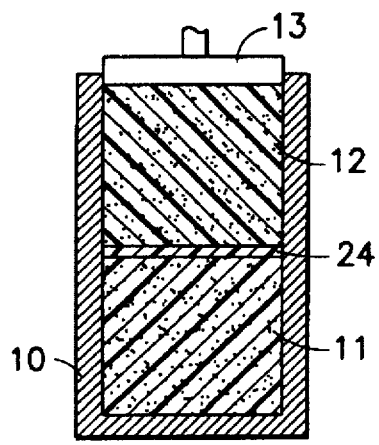
FIG. 5 is a view similar to FIG. 1, showing a non-porous plastic sheet between the two quantities of plastic granules in the mold.

For some applications, it is desirable to have a microporous or non-porous barrier between the two regions of the dual-porosity strip, e.g., between the regions 11" and 12" (FIG. 4). In such a case, as illustrated in FIG. 5, a microporous or non-porous plastic sheet 24 is placed in the mold after the first quantity of plastic granules 11 is placed in the mold, but before the second quantity 12 is placed in the mold. The same steps as described above with respect to formation of the billet and skiving the strip from the billet are then carried out. The result is a strip, similar to that illustrated in FIG. 4, only with a micro-porous or non-porous barrier layer between the regions 11" and 12".

Sheet 24 may be of any of the plastic resins described above. Again, however, the fusing temperature of sheet 24 must be compatible with the fusing temperatures of the plastic granules of quantities 11 and 12. More specifically, sheet 24 must not completely melt before fusing of the particles takes place, so that the sheet loses its integrity and fails to serve in the final product as a barrier layer.

The thickness of sheet 24 is typically between one mil and one quarter inch. If a micro-porous barrier sheet is employed, it will typically be a membrane having pores which are one micron or less in size.

Figure 6:
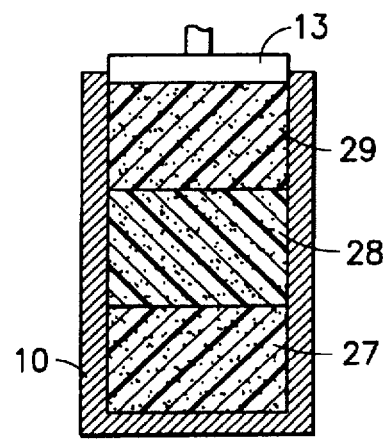
FIG. 6 is a view similar to FIG. 1, showing three quantities of different sized granules in the mold.

As described above, the final strip 24 incorporates regions of two different porosities. The method of the present invention can be used to make strips having three or more different porosities. This is done simply by placing into the mold additional discrete quantities of plastic granules having different sizes. As illustrated in FIG. 6, quantities 27, 28, and 29 of plastic granules are introduced into mold 10, the particle size of each quantity being different from the particle size of every other quantity of granules. After the billet is formed and skived, the resulting strip will have three different regions each having a different porosity. If desired, a non-porous sheet can be placed between each successive quantity of particles 27, 28 and 29 so as to produce a non-porous barrier layer between each region of the final strip.

A strip may sometime be desired in which the regions 11" and 12" (FIG. 4) are of the same porosity, but are separated by a barrier layer 24 In such a case, the method described above can be employed, but the size of the granules 11 and 12 (FIG. 5) will be the same instead of different. Using the same size granules in the quantities 11 and 12 will yield regions 11' and 12' of the billet having the same porosity.

Forming a cylindrical billet 14 and skiving strip 21 from the cylindrical surface of the billet (FIG. 3) is the preferred way of carrying out the present invention. However, if desired, a billet having a rectangular cross section could be produced and individual strips sliced from the billet. However, an advantage of using the cylindrical billet and a skiving operation is that the strip is formed continuously, until the billet is exhausted and strips having a great variety of lengths can be cut from the original long strip. Thus, use of a cylindrical billet and a skiving operation is both more versatile and less expensive.

The invention has been shown and described in preferred form only, and by way of example, and many variations may be made in the invention which still be comprised within its spirit. It is understood, therefore, that the invention is not limited to any specific form or embodiment except insofar as such limitations are included in the appended claims.

I claim:

1. A method of making a dual-porosity porous plastic strip, comprising the steps of:

placing a first quantity of plastic granules into a substantially cylindrical mold, placing a second quantity of plastic granules into the mold above the first quantity, the particle size of the second quantity of granules being different from the particle size of the first quantity of granules, subjecting all the granules in the mold to heat and pressure so as to fuse the granules together into a self-sustaining substantially cylindrical porous plastic billet, the billet having two fused-together regions corresponding to the two quantities of granules, the two regions having porosities which differ from each other, and slicing the billet in a direction transverse to the plane containing the interface between the two regions of the billet so as to create a strip, the strip being created by skiving off the substantially cylindrical surface of the billet, and the strip comprising two interconnected regions having porosities which differ from each other.

2. A method as defined in claim 1 wherein the mold is cylindrical and the different-porosity regions are side-by-side in the axial direction of the billet, and a strip is created by skiving off the cylindrical surface of the billet.

3. A method as defined in claim 1 including the step of placing a fusible micro-porous or non-porous barrier sheet into the mold on the top of the first quantity of granules before the second quantity of granules is placed in the mold, so that the final strip contains a barrier layer between two porous plastic regions.

4. A method of making a multi-porosity porous plastic strip, comprising the steps of:

placing a series of quantities of plastic granules into a substantially cylindrical mold one above another, the particle size of each quantity being different from the particle size of every other quantity, subjecting all the granules in the mold to heat and pressure so as to fuse the granules together into a self-sustaining porous plastic billet, the billet having a number of fused-together regions corresponding to the number of quantities of granules placed into the mold, and slicing the billet in a direction transverse to the planes containing the interfaces between the different regions of the billet so as to create a strip, the strip being created by skiving off the substantially cylindrical surface of the billet, and the strip comprising two interconnected regions having porosities which differ from each other.

5. A method of making a dual-porosity porous plastic strip, comprising the steps of:

placing a first quantity of plastic granules into a mold, placing a fusible micro-porous or non-porous barrier sheet into the mold on the top of the first quantity of granules, placing a second quantity of plastic granules into the mold above the barrier sheet, subjecting all the granules and barrier sheet in the mold to heat and pressure so as to fuse the granules and sheet together into a self-sustaining porous plastic billet, the billet having two fused-together regions corresponding to the two quantities of granules with the barrier sheet fused between the regions, and slicing the billet in a direction transverse to the plane containing the barrier sheet so as to create strips, each strip comprising two interconnected porous plastic regions having a barrier layer between the regions.

* * * * *